(12) United States Patent
Stefanoski et al.

(10) Patent No.: US 8,514,932 B2
(45) Date of Patent: Aug. 20, 2013

(54) CONTENT ADAPTIVE AND ART DIRECTABLE SCALABLE VIDEO CODING

(75) Inventors: Nikolce Stefanoski, Hannover (DE); Aljosa Smolic, Zurich (CH); Yongzhe Wang, Shanghai (CN); Manuel Lang, Zurich (CH); Alexander Hornung, Zurich (CH); Markus Gross, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 744 days.

(21) Appl. No.: 12/702,195

(22) Filed: Feb. 8, 2010

(65) Prior Publication Data

US 2011/0194024 A1 Aug. 11, 2011

(51) Int. Cl.
*H04N 7/12* (2006.01)
*H04N 7/01* (2006.01)
*H04N 7/32* (2006.01)
*H04N 11/02* (2006.01)

(52) U.S. Cl.
USPC ............ 375/240.01; 375/240.12; 375/240.25; 375/240.26; 348/441

(58) Field of Classification Search
USPC ........................................ 375/240.01, 240.24
See application file for complete search history.

(56) References Cited

U.S. PATENT DOCUMENTS

| 6,437,795 B1 * | 8/2002 | Brown .......................... 345/620 |
| 2003/0020732 A1 * | 1/2003 | Jasa et al. ...................... 345/645 |
| 2010/0214312 A1 * | 8/2010 | Weber et al. .................. 345/593 |

FOREIGN PATENT DOCUMENTS

JP   2006295600 A   * 10/2006

OTHER PUBLICATIONS

Jens-Rainer Ohm ("Motion-Compensated 3-D Subband Coding with Multiresolution representation of Motion Parameters", 1994, pp. 250-254, IEEE).*
Sakazume et al., Extended Spatial Scalability with a Partial Geometric Transform, Joint Video Team (JVT) of ISO/IEC MPEG & ITU-T VCEG, 15th Meeting: Busan, KR, Apr. 16-22, 2005, 20 pages.
Krähenbühl et al., A System for Retargeting of Streaming Video, ACM Transactions on Graphics (TOG)—Proceedings of ACM SIGGRAPH Asia 2009, vol. 28, Issue 5, Article No. 126, 10 pages, Dec. 2009, Publisher: ACM, New York, NY, USA.
Liu et al., Inter-layer Prediction for SVC Bit-Depth Scalability, Joint Video Team (JVT) of ISO/IEC MPEG & ITU-T VCEG, 24th Meeting: Geneva, CH, Jun. 29 to Jul. 5, 2007, 12 pages.
Smolic et al., Non-Linear Warping and Warp Coding for Content-Adaptive prediction in Advance Video Coding Applications, Proceedings of the 2010 IEEE 17th International Conference on Image Processing (ICIP 2010), Hong Kong, Sep. 26-29, 2010, pp. 4225-4228, Publisher: IEEE, Piscataway, NJ, USA.
George Wolberg, Chapter 5: Image Resampling, Digital Image Warping, pp. 117-161, Jan. 1, 1992, Publisher: IEEE Computer Society Press, Los Alamitos, CA, USA.

(Continued)

*Primary Examiner* — Joseph Ustaris
*Assistant Examiner* — On S Mung
(74) *Attorney, Agent, or Firm* — Patterson & Sheridan, LLP

(57) ABSTRACT

Systems, methods and articles of manufacture are disclosed for performing scalable video coding. In one embodiment, non-linear functions are used to predict source video data using retargeted video data. Differences may be determined between the predicted video data and the source video data. The retargeted video data, the non-linear functions, and the differences may be jointly encoded into a scalable bitstream. The scalable bitstream may be transmitted and selectively decoded to produce output video for one of a plurality of predefined target platforms.

36 Claims, 10 Drawing Sheets

(56) References Cited

OTHER PUBLICATIONS

Kai Hormann, Barycentric Coordinates for Arbitrary Polygons in the Plane, IFI Technical Reports, IFI-05-05, pp. 1-21, Feb. 1, 2005, Publisher: Clausthal University of Technology, Clausthal-Zellerfeld, Germany.

Search Report dated Jul. 3, 2012 for EP application No. 11250140.8.

\* cited by examiner

CONTENT ADAPTIVE AND ART DIRECTABLE SCALABLE VIDEO CODING

BACKGROUND

1. Field of the Invention

The present invention relates to the field of computer graphics and, in particular, to a system and method for scalable video coding.

2. Description of the Related Art

Various devices exist today for displaying video content. Examples of the devices include cinema theaters, television, projectors for home cinema, smart phones, etc. These devices often support different aspect ratios such as 4:3, 16:9, 21:9, 1:1, 2:1, and 5:8. To properly display video content on a particular device, video content may be "retargeted" for playback on the device—e.g., to an aspect ratio that is native to the device. Retargeting video content includes performing one or more video processing operations so that the video content is better suited for the particular device.

One technique for video retargeting includes linear downscaling, where the source content is linearly scaled (both vertically and horizontally) to fit within the frame size of a target device. Other techniques remove "unimportant" content by cropping and/or panning. Cropping includes trimming the width and/or height of a source video to produce a target video with a lesser width and/or height to fit within the frame size of the target device. Panning includes selecting a portion of the source video is selected that matches the frame size of the target device.

SUMMARY

One embodiment of the invention provides a method that may include receiving a retargeted sequence of images having a target image format. The retargeted sequence of images may be retargeted from a source sequence of images having a source image format. The method may also include determining at least one non-linear function configured to generate a predicted sequence of images having the source image format from the retargeted sequence of images having the target image format. The method may also include determining differences between the predicted sequence of images having the source image format and the source sequence of images having the source image format. The method may also include generating a single bitstream by encoding: (i) the received retargeted sequence of images having the target image format; (ii) the at least one non-linear function; and (iii) the determined differences.

Another embodiment of the invention provides a computer-readable storage medium containing a program which, when executed, performs an operation that may include receiving a retargeted sequence of images having a target image format. The retargeted sequence of images may be retargeted from a source sequence of images having a source image format. The operation may also include determining at least one non-linear function configured to generate a predicted sequence of images having the source image format from the retargeted sequence of images having the target image format. The operation may also include determining differences between the predicted sequence of images having the source image format and the source sequence of images having the source image format. The operation may also include generating a single bitstream by encoding: (i) the received retargeted sequence of images having the target image format; (ii) the at least one non-linear function; and (iii) the determined differences.

Still another embodiment of the invention provides a system including a computer processor and a memory containing a program which, when executed by the computer processor, is configured to perform an operation that may include receiving a retargeted sequence of images having a target image format. The retargeted sequence of images may be retargeted from a source sequence of images having a source image format. The operation may also include determining at least one non-linear function configured to generate a predicted sequence of images having the source image format from the retargeted sequence of images having the target image format. The operation may also include determining differences between the predicted sequence of images having the source image format and the source sequence of images having the source image format. The operation may also include generating a single bitstream by encoding: (i) the received retargeted sequence of images having the target image format; (ii) the at least one non-linear function; and (iii) the determined differences.

Yet another embodiment of the invention provides a method that may include receiving a single bitstream. The single bitstream may include: (i) an encoded retargeted sequence of images having a target image format; (ii) at least one encoded non-linear function to predict a source sequence of images having a source image format from the retargeted sequence of images, to thereby generate a predicted sequence of images having the source image format; and (iii) encoded differences between the source sequence of images and the predicted sequence of images. The method may also include decoding the single bitstream to generate a sequence of images in one of target image format and the source image format.

Another embodiment of the invention provides a method that may include receiving a request for a single bitstream. The method may also include transmitting the single bitstream in response to the request. The single bitstream may include: (i) an encoded retargeted sequence of images having a target image format; (ii) at least one encoded non-linear function to predict a source sequence of images having a source image format from the retargeted sequence of images, to thereby generate a predicted sequence of images having the source image format; and (iii) encoded differences between the source sequence of images and the predicted sequence of images. The single bitstream, when decoded, may generate a sequence of images in one of target image format and the source image format.

Still another embodiment of the invention provides a method that may include generating a single bitstream by encoding: (i) a retargeted sequence of images having a target image format; (ii) at least one non-linear function to predict a source sequence of images having a source image format from the retargeted sequence of images, to thereby generate a predicted sequence of images having the source image format; and (iii) differences between the source sequence of images and the predicted sequence of images. The single bitstream, when decoded, may generate a sequence of images in one of target image format and the source image format.

Yet another embodiment of the invention provides a method that may include receiving a single bitstream receiving a retargeted sequence of images having a target image format. The retargeted sequence of images may be retargeted from a source sequence of images having a source image format. The method may also include generating a predicted sequence of images having the source image format from the retargeted sequence of images having the target image format and using at least one non-linear function.

Another embodiment of the invention provides a method that may include providing at least one non-linear function configured to generate a predicted sequence of images having a source image format from the retargeted sequence of images having a target image format. The retargeted sequence of images may be retargeted from a source sequence of images having the source image format. The method may also include encoding the at least one non-linear function.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
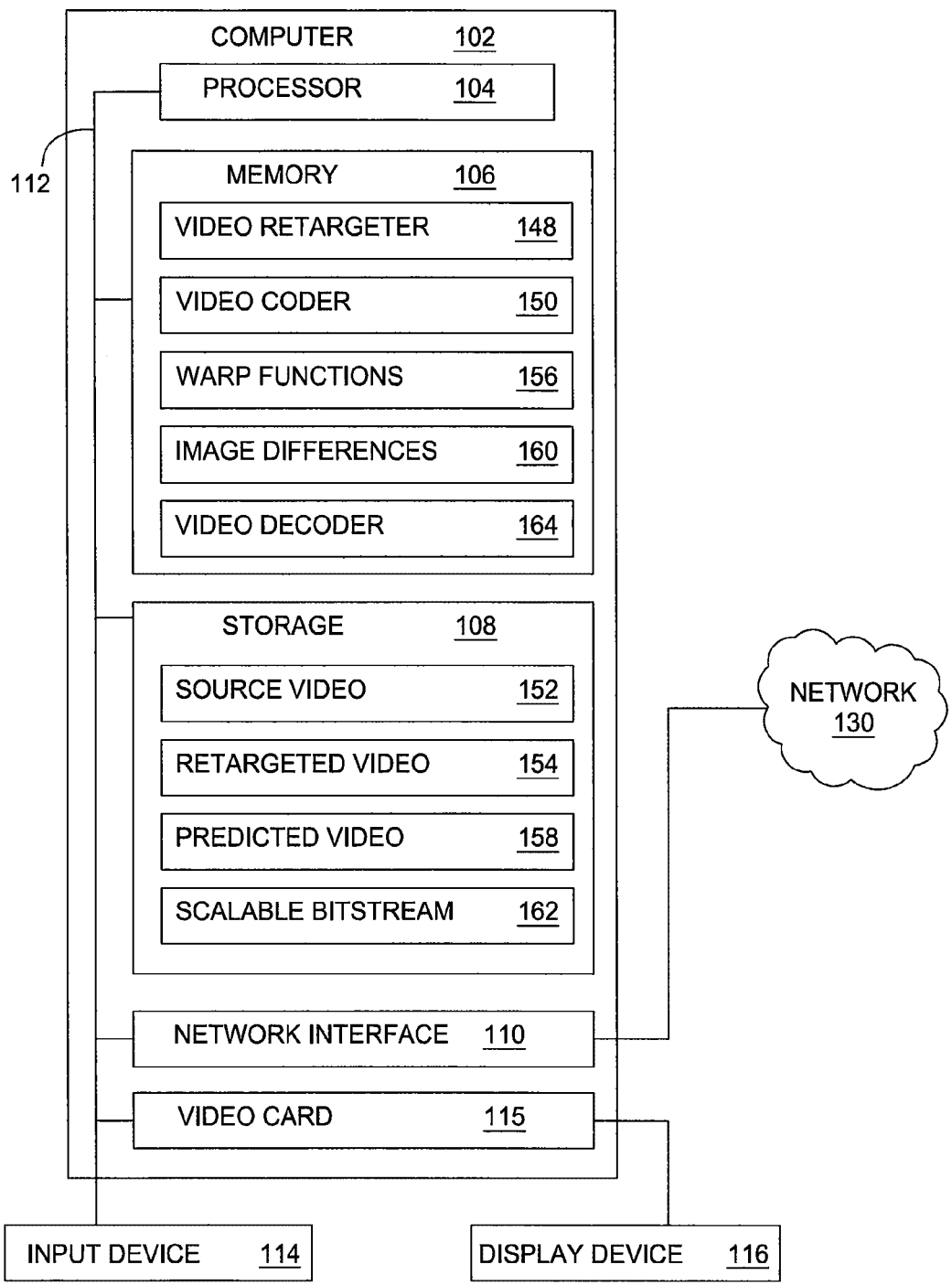
FIG. 1 is a block diagram illustrating a system for generating a scalable bitstream, according to one embodiment of the invention.

Embodiments of the invention provide techniques for scalable video coding that supports nonlinear relationships between target platforms. The nonlinear relationships may be in the form of a function such as a warp. Linear warping techniques, such as linear downscaling, cropping, and/or panning, do not take into account the underlying content being retargeted. In contrast, nonlinear warps can preserve specific information of an image (such as face and body proportions) at the expense of less important information of the image (such as walls in the background). Consequently, nonlinear warps may be used to retarget video in a content-adaptive (and art-directable) way. Advantageously, retargeting video content using nonlinear warps may produce video output that is better suited to a target platform.

One embodiment of the invention generates a scalable bitstream that may be transmitted and selectively decoded to produce output video for one of a plurality of predefined target platforms. For example, the scalable bitstream may be decoded to produce output video having an aspect ratio of 16:9 (e.g., 1280×720 resolution). Alternatively, the scalable bitstream may be decoded to produce output video having an aspect ratio of 4:3 (e.g., 720×576 resolution). Further, the scalable bitstream supports nonlinear warps between the output videos of the respective aspect ratios. Advantageously, video content that is suited for multiple target platforms may be stored and transmitted more efficiently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for generating a scalable bitstream, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a video card 115, a storage 108, an input device 114, and a display device 116. The computer 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The display device 116 may operate in conjunction with the video card 115 to provide output to a user of the computer 102. Although shown separately from the input device 114, the display device 116 and input device 114 may be combined. For example, a display screen with an integrated touch-screen or a display with an integrated keyboard may be used.

In one embodiment, the video card 115 incorporates circuitry that is optimized for graphics and video processing and that constitutes a graphics processing unit (GPU). In another embodiment, the video card 115 incorporates circuitry optimized for general purpose processing. In yet another embodiment, the video card 115 may be integrated with one or more other system elements, such as the processor 104, to form a system on chip (SoC). In still further embodiments, the video card 115 is omitted and software executed by processor 104 performs the functions of the video card 115.

Pixel data can be provided to video card 115 directly from processor 104. In some embodiments of the present invention, instructions and/or data representing a scene are provided to a render farm or a set of server computers, each similar to the system 100, via the network interface device 110 or the storage 108. The render farm generates one or more rendered images of the scene using the provided instructions and/or data. These rendered images may be stored on computer-readable media in a digital format and optionally returned to the system 100 for display. Similarly, images processed by video card 115 may be output to other systems for display, stored in the storage 108, or stored on computer-readable media in a digital format.

Alternatively, the processor 104 provides the video card 115 with data and/or instructions defining the desired output images, from which the video card 115 generates the pixel data of one or more output images. The data and/or instructions defining the desired output images can be stored in the memory 106 or graphics memory within the video card 115. In an embodiment, the video card 115 includes 3D rendering capabilities for generating pixel data for output images from instructions and data defining the geometry, lighting shading, texturing, motion, and/or camera parameters for a scene. The video card 115 can further include one or more programmable execution units capable of executing shader programs, tone mapping programs, and the like.

Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, the memory 106 of the computer 102 includes a video retargeter 148, a video coder 150, warp functions 156, image differences 160, and a video decoder 164. The storage 108 of the computer 102 includes a source video 152, a retargeted video 154, a predicted video 158, and a scalable bitstream 162. In one embodiment, the video retargeter 148 may be any software application that receives the source video 152 and produces video output (the retargeted video 154) that is suited to a target platform. In one embodiment, the video coder 150 may be any software application that generates the scalable bitstream 162 using the retargeted video 154 and other inputs. The scalable bitstream may be transmitted to one or more target devices having a respective video decoder 164. In one embodiment, the video decoder 164 may be any software application that selectively decodes the received scalable bitstream to produce output video for one of a plurality of predefined target platforms. In an alternative embodiment, functionality of the video retargeter 148 and of the video coder 150 may be combined in a single application.

Figure 2:
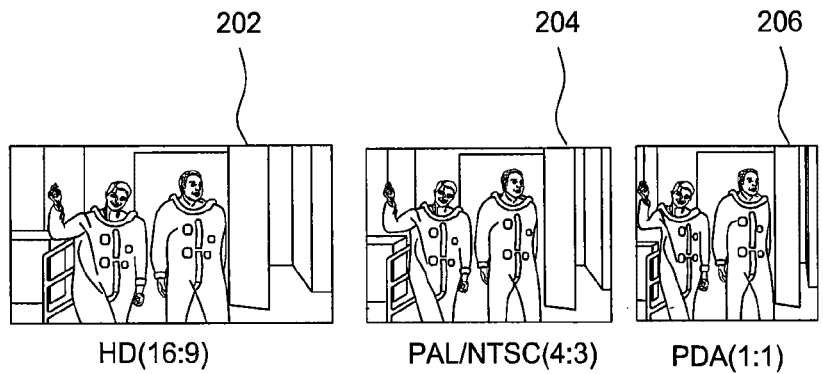
FIG. 2 shows images produced by a video retargeter, according to one embodiment of the invention.

FIG. 2 shows images produced by the video retargeter 148, according to one embodiment of the invention. As described above, the video retargeter 148 produces video output suited to a target platform. For example, the video retargeter 148 may retarget an image 202 of the source video into an image 204 in the first target format and into an image 206 in the second target format. Illustratively, source video image 202 may have a 16:9 aspect ratio (e.g., high-definition (HD) video), while the first target format has a 4:3 aspect ratio (e.g., PAL/NTSC) and the second target format has a 1:1 aspect ratio (e.g., a personal digital assistant (PDA) device). The video retargeter 148 may use nonlinear warps (to preserve specific information of an image 202 (such as face and body proportions) at the expense of less important information of the image 202 (such as walls in the background).

In one embodiment, the video retargeter 148 computes a warp function for each frame of the source video 152. The warp function for a given frame of the source video 152 specifies how the shape of each pixel of the frame is deformed when mapped to a target platform. The warp function may differ from frame to frame of the source video 152 to more properly retarget the source video 152. The warp function may be computed based on saliency information extracted from the source video 152. The warp function may additionally be computed based on user-specified feature regions at specific key frames of the source video 152. The video retargeter 148 may also perform operations (such as 2D splatting) to remove aliasing when warping an image to the target platform.

Figure 3:
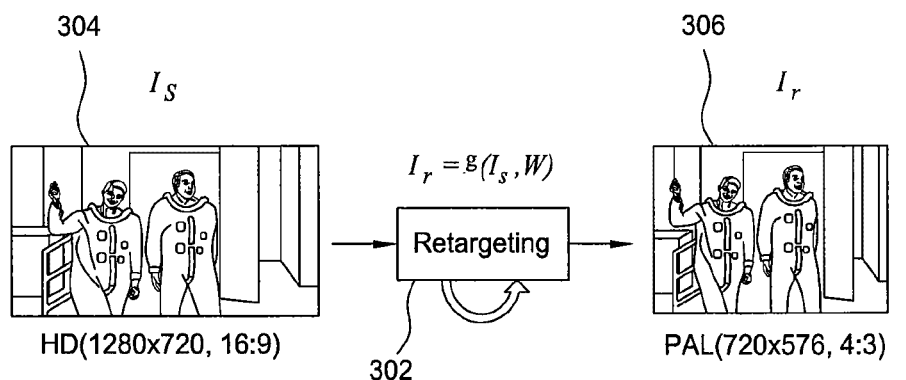
FIG. 3 illustrates a procedure for retargeting video, according to one embodiment of the invention.
Figure 3:
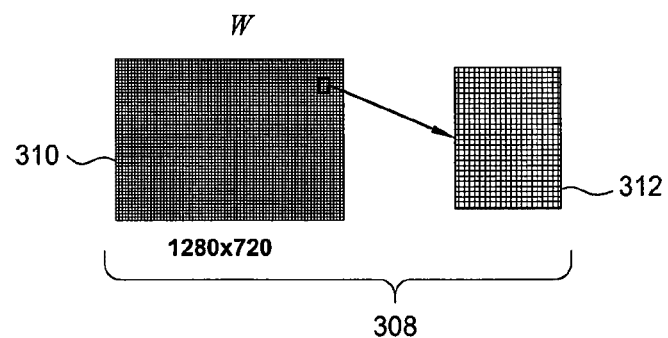

FIG. 3 illustrates a procedure 302 performed by the video retargeter 148 for retargeting video, according to one embodiment of the invention. As shown, the procedure 302 computes a target video frame $I_r$ according to the equation:

$$I_r = g(I_s, W) \qquad \text{(Equation 1)}$$

where $I_s$ is the source video frame 304, $I_r$ is the target video frame 306, W is the warp function 310, and g( ) is the image mapping operator. In one embodiment, the image mapping operator may include 2D splatting to remove aliasing. Also shown is a visualization 308 of the warp function 310. The warp function 310 specifies how the shape of each pixel of the source video frame 304 is deformed when mapped to a target video frame 306. A zoom to a part 312 of the warp function 310 shows that the warp function 310 is represented by a quad grid. In one embodiment, the quad grid 310 has the same aspect-ratio as the target video frame 306, while each quad of the quad grid 310 is uniquely assigned to a pixel in the soured video frame 304. In particular, the number of quads of the quad grid 310 may be equal to the number of pixels of the source video frame 304. Each quad of the warp function 310 describes the shape deformation of a corresponding pixel of the source video frame 304, which is applied when mapping the pixel to the target video frame 306 during retargeting 302.

In one embodiment, the video coder 150 jointly encodes the source video 152 and one or more retargeted videos 154 into a single scalable bitstream. The single scalable bitstream may be transmitted and selectively decoded to produce the source video 152 or any of the retargeted videos 154. In order to encode more efficiently, the video coder 150 may identify and exploit dependencies among the source video 152 and the one or more retargeted videos 154. The video coder 150 may exploit the identified dependencies to encode more efficiently.

Figure 4:
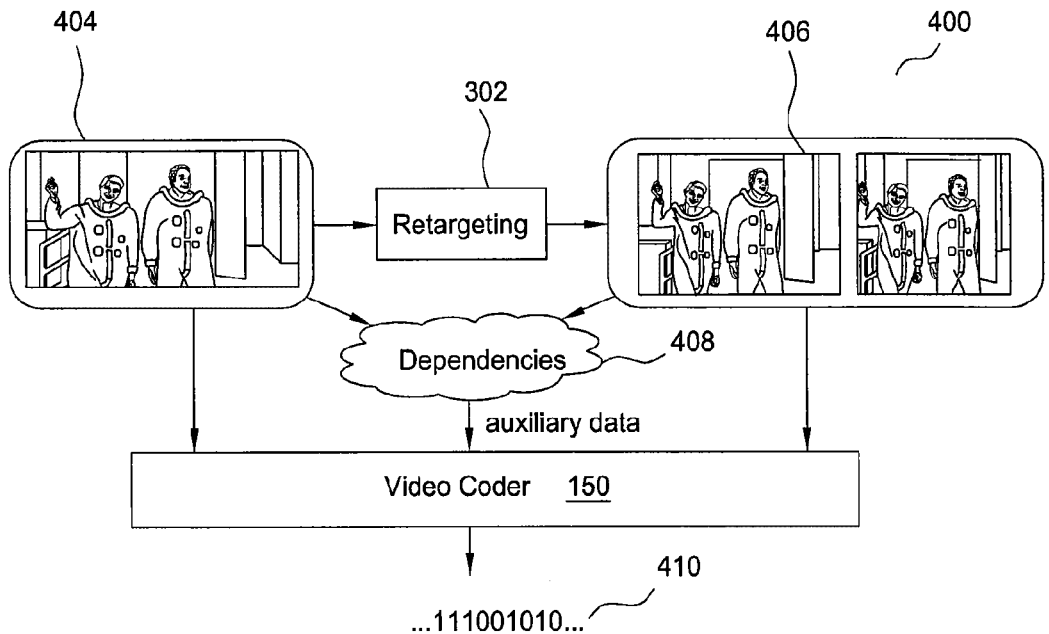
FIG. 4 illustrates a procedure for scalable video coding, according to one embodiment of the invention.

FIG. 4 illustrates a procedure 400 for scalable video coding, according to one embodiment of the invention. As shown, the video coder 150 encodes both the source video 404 and one or more target videos 406 into a scalable bitstream 410. Further, dependencies 408 between the source video 404 and the target videos 406 may be computed and provided as an auxiliary data input to the video coder 150. The video coder 150 may use the auxiliary data to encode the source video 404 and the target videos 406 more efficiently. In one embodiment, the auxiliary data may include warp functions 156 for each frame of the target video. In one embodiment, the warp function 156 for a given frame of a target video specifies how the shape of each pixel in the frame is deformed when mapped to a corresponding frame of the source video. That is, these warp functions 156 map pixel shapes in an opposite direction (i.e., from target video back to source video) of the warp functions for retargeting the source video to a target video. Hence, these warp functions 156 may also be referred to herein as inverse warp functions. In an alternative embodiment, the video coder 150 may encode warps from the source video 404 to a target video, rather than the inverse warps. For example, the warps from the source video 404 to the target video may be used in a "backward mapping" approach to predicting video, which is discussed below in conjunction with the prediction module 610 of FIG. 6.

Figure 5:
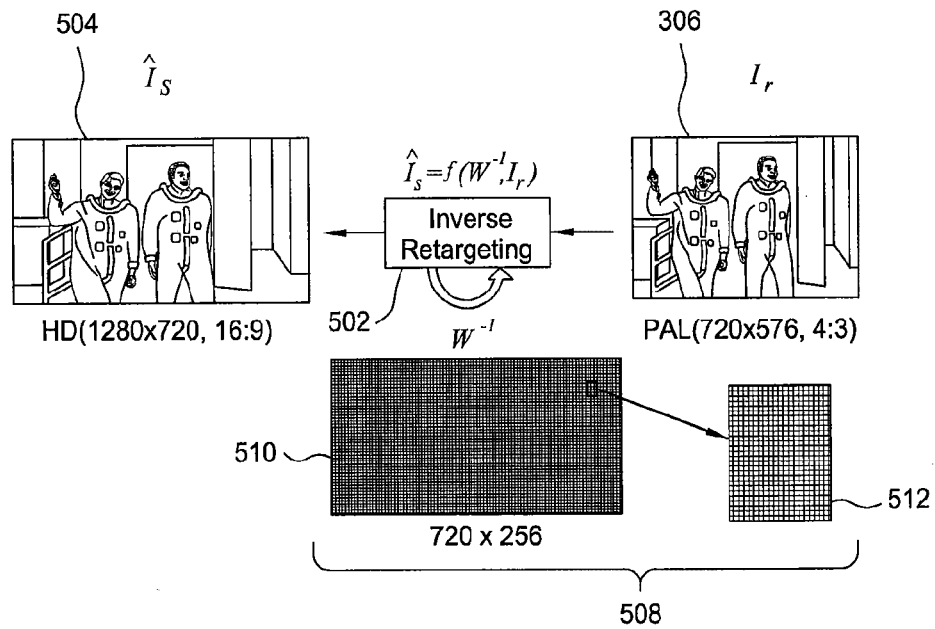
FIG. 5 illustrates a procedure for predicting a source video, according to one embodiment of the invention.

FIG. 5 illustrates a procedure 502 for predicting a source video, according to one embodiment of the invention. In other words, FIG. 5 illustrates an operation performed by the video coder 150 for generating the predicted video 158 from the retargeted video 154. As shown, the procedure 502 predicts a source video frame $\hat{I}_s$ according to the equation:

$$\hat{I}_s = f(W^{-1}, I_r) \qquad \text{(Equation 2)}$$

where $\hat{I}_s$ is the predicted source video frame 504, $I_r$ is the retargeted (or target) video frame 306, $W^{-1}$ is the inverse warp function 510, and f( ) is the inverse image mapping operator. The retargeted video frame $I_r$ may also be expressed herein as a target video frame $I_T$. As is further discussed below, the predicted source video frame 504 may not necessarily be identical to the source video frame 304 of FIG. 3. Also shown is a visualization 508 of the inverse warp function 510. The inverse warp function 510 specifies how the shape of each pixel of the target video frame 306 is deformed when mapped to a predicted source video frame 504. A zoom to a part 512 of the inverse warp function 510 shows that the inverse warp function 510 may be represented by a quad grid. The quad grid 510 may have the same aspect-ratio as the source video frame 504, while each quad of the quad grid 510 is uniquely assigned to a pixel in the target video frame 306. In particular, the number of quads of the quad grid 510 may be equal to the number of pixels of the target video frame 306. Each quad of the inverse warp function 510 describes the shape deformation of a corresponding pixel of the target video frame 306, which is applied when mapping the pixel to the source video frame 504 during inverse retargeting or prediction 502.

In one embodiment, the video coder 150 may compute differences 160 between the predicted video 158 and the source video 152. For example, the video coder 150 may compute per-pixel differences between each frame of the predicted video 158 and the corresponding frame of the source video 152. The video coder 150 then encodes the retargeted video 154, inverse warp functions 508, and per-pixel differences into a scalable bitstream. The scalable bitstream may be transmitted to a target device, which executes the video decoder 164 to selectively decode the retargeted video 154 or the source video 152 from the scalable bitstream. For example, the video decoder 164 may decode the retargeted video 154, the inverse warp functions 156, and the per-pixel differences 160 from the scalable bitstream. The video decoder 164 may apply the inverse warp functions to the retargeted video 154 to obtain the predicted video 158. The video decoder 164 may then apply the per-pixel differences to the predicted video 158 to generate the source video 152.

Figure 6:
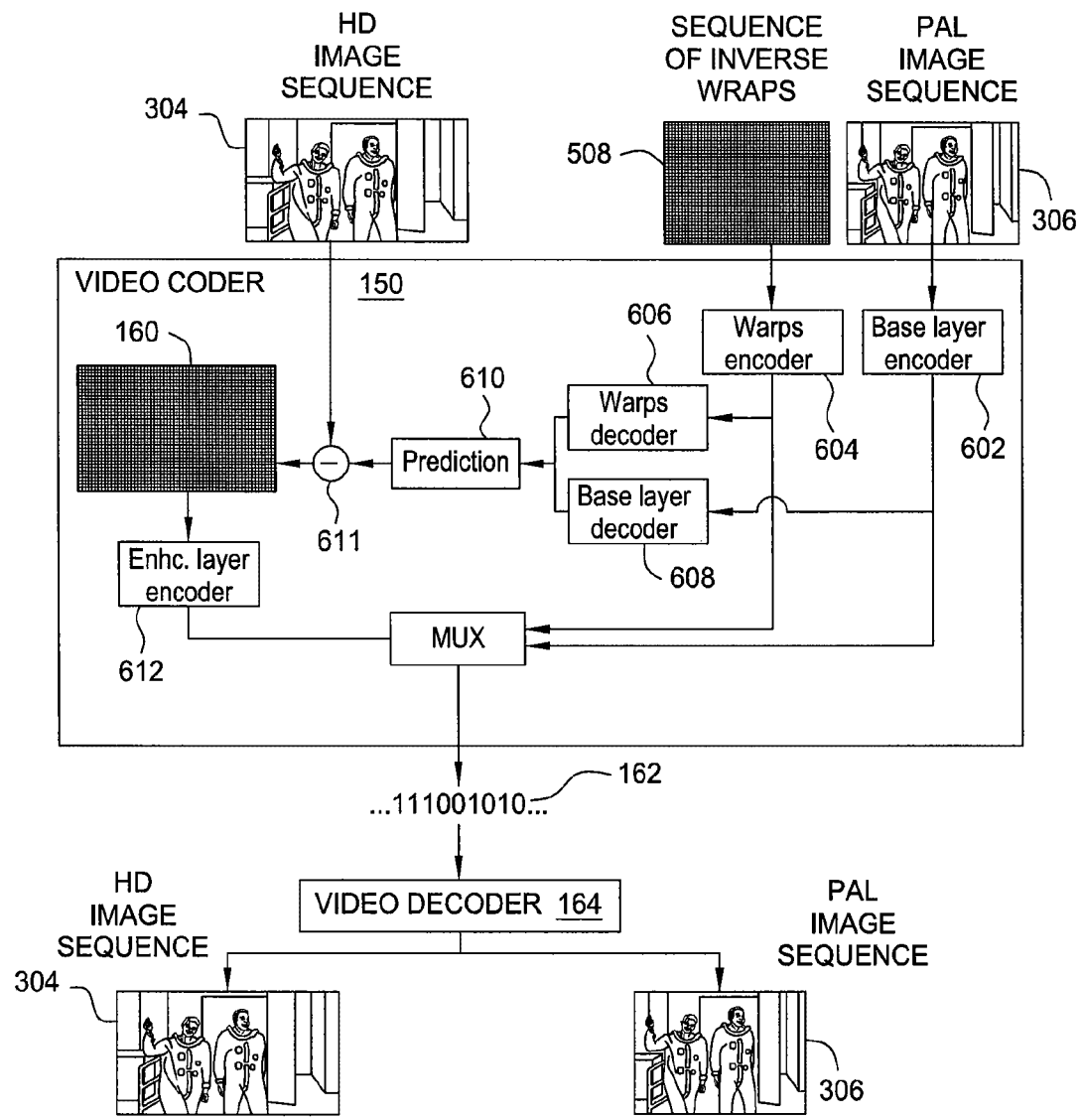
FIG. 6 illustrates components of a video coder, according to one embodiment of the invention.

FIG. 6 illustrates components of the video coder 150 of FIG. 1, according to one embodiment of the invention. As shown, the video coder 150 includes a base layer encoder 602, a warps encoder 604, a warps decoder 606, a base layer decoder 608, a prediction module 610, a difference module 611, an enhancement layer encoder 612, and a multiplexer 614. As used herein, the base layer refers to the retargeted video that satisfies predefined criteria (such as having the lowest resolution among the retargeted videos to be encoded). In one embodiment, the base layer encoder 602 encodes a retargeted video 306 (e.g., a PAL image sequence). The warps encoder 604 encodes a sequence of inverse warps that map pixel shapes from each frame of the retargeted video 306 to the corresponding frame of the source video 304 (e.g., an HD image sequence).

In one embodiment, the prediction module 610, the warps decoder 606, and the base layer decoder 608 operate in conjunction to generate the predicted video 158. The difference module 611 computes per-pixel differences 160 between the predicted video 158 and the source video 304. The per-pixel differences may also be referred to herein as the enhancement layer. The multiplexer 614 combines the encoded base layer, the encoded inverse warps, and the encoded enhancement layer into a scalable bitstream 162. Advantageously, the scalable bitstream 162 may be transmitted and decoded to produce output video for one of a plurality of predefined platforms. For example, the scalable bitstream 162 may be selectively decoded by the video decoder 164 to produce either the retargeted video 306 or the source video 304. Consequently, using the scalable bitstream 162, video content that is suited for multiple target platforms may be stored and transmitted more efficiently.

In one embodiment, a warp is represented by a regular, two-dimensional quad grid with parameter domain $$D := I \times J \quad \text{(Equation 3)}$$

where $I = \{0, \ldots, I\}$ and $J = \{0, \ldots, J\}$ and where each grid vertex $(i, j)$ of $D$ has a 2D position $$w[i,j] \in \Re^2$$

assigned. Because each frame $f$ of an image sequence is assigned a warp, the position of a grid vertex in frame $f$ may be denoted as $$w^f[i,j] \in \Re^2.$$

Figure 7:
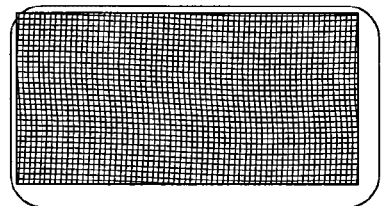
FIG. 7 illustrates two warps of an image sequence, according to one embodiment of the invention.
Figure 7:
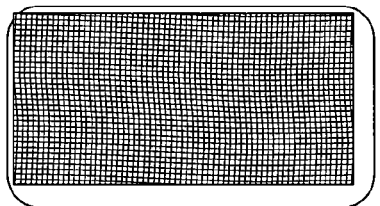

FIG. 7 illustrates two warps of an image sequence, according to one embodiment of the invention. As shown, the warps include a first warp 702 corresponding to frame 300 of the image sequence. The warps also include a second warp 704 corresponding to frame 320 of the image sequence. Each vertex of the warps 702, 704 represents a position $w^f[i,j]$ that is connected to up to four neighboring vertices via edges. In particular, 2D positions $(i,j)$, $(i-1,j)$, $(i, j-1)$, $(i-1,j-1)$ describe the shape of a pixel, while 2D positions $w[i,j]$, $w[i-1,j]$, $w[i,j-1]$, $w[i-1, j-1]$ describe its shape deformation of this pixel according to the warp function $w[\cdot,\cdot]$.

In one embodiment, a warp is represented using a continuous (rather than discrete) parameter domain. Representing warps using a continuous parameter domain allows the sub-sampling of warps at arbitrary positions between grid vertices. Thus, a continuous warp may be denoted as $$w(x,y) \in \Re^2$$

where $x \in [0,I]$ and $y \in [0,J]$. The continuous warp has the property $$w(i,j) = w[i,j]$$

when restricted to integer coordinates according to $i \in \{0, \ldots, I\}$ and $j \in \{0, \ldots, J\}$. In one embodiment, the function $w(x, y)$ may be defined at non-integer positions using Wachspress coordinates. As is known, Wachspress coordinates refer to a type of generalized barycentric coordinates. Barycentric coordinates are coordinates defined by the vertices of a simplex (e.g., a triangle, a tetrahedron, etc.). Generalized barycentric coordinates refer to barycentric coordinates that are defined with respect to a polytope (instead of a simplex). In an alternative embodiment, other types of generalized barycentric coordinates (such as mean value coordinates) may be used to define the function $w(x, y)$ at non-integer positions.

As described above, the function $w(x, y)$ may be defined at non-integer positions using Wachspress coordinates. Let $$Q(\vec{x}, \vec{q}_1, \vec{q}_2, \vec{q}_3, \vec{q}_4) = (a,b,c,d)^t \in \Re^4 \quad \text{(Equation 4)}$$

represent the Wachspress coordinates $(a, b, c, d)^t$ of point $\vec{x} = (x, y)^t$ with respect to 2D points $\vec{q}_i$ for $i=1, 2, 3, 4$. Thereby, $(a, b, c, d)^t$ denotes the transpose of $(a, b, c, d)$, i.e. $(a, b, c, d)$ is a row vector while $(a, b, c, d)^t$ is a column vector. Hence, $\vec{x} = [\vec{q}_1, \vec{q}_2, \vec{q}_3, \vec{q}_4] \cdot (a, b, c, d)^t$. Further, let $$w(x,y) := [w(\vec{q}_1) w(\vec{q}_2) w(\vec{q}_3) w(\vec{q}_4)] \cdot Q(\vec{x}, \vec{q}_1, \vec{q}_2, \vec{q}_3, \vec{q}_4) \quad \text{(Equation 5)}$$

where $$\vec{q}_1 := (\lfloor x \rfloor, \lfloor y \rfloor)^t,$$
$$\vec{q}_2 := (\lfloor x \rfloor + 1, \lfloor y \rfloor)^t,$$
$$\vec{q}_3 := (\lfloor x \rfloor + 1, \lfloor y \rfloor + 1)^t, \text{ and}$$
$$\vec{q}_4 := (\lfloor x \rfloor, \lfloor y \rfloor + 1)^t.$$

Wachspress coordinates can also be used to calculate an inverse warp $iw(r, s)$. Let $$\vec{q}_1 := (i,j)^t,$$
$$\vec{q}_2 := (i+1,j)^t,$$
$$\vec{q}_3 := (i+1,j+1)^t, \text{ and}$$
$$\vec{q}_4 := (i+1,j)^t$$

be the points in the discrete parameter domain that define the quad $w(\vec{q}_1), w(\vec{q}_2), w(\vec{q}_3), w(\vec{q}_4)$ that has a point $(r, s)^t$ as an inner point. The inverse position $iw(r, s)$ may be determined according to $$iw(r,s) := [\vec{q}_1 \vec{q}_2 \vec{q}_3 \vec{q}_4] \cdot Q((r,s)^t, w(\vec{q}_1), w(\vec{q}_2), w(\vec{q}_3), w(\vec{q}_4)) \quad \text{(Equation 6)}$$

The inverse warp, when using Wachspress coordinates, may not necessarily satisfy the property $w(iw(r, s)) = (r, s)$. However, using Wachspress coordinates to invert warps may yield superior performance compared to using coordinates that satisfy this property (e.g., mean value coordinates).

Figure 8:
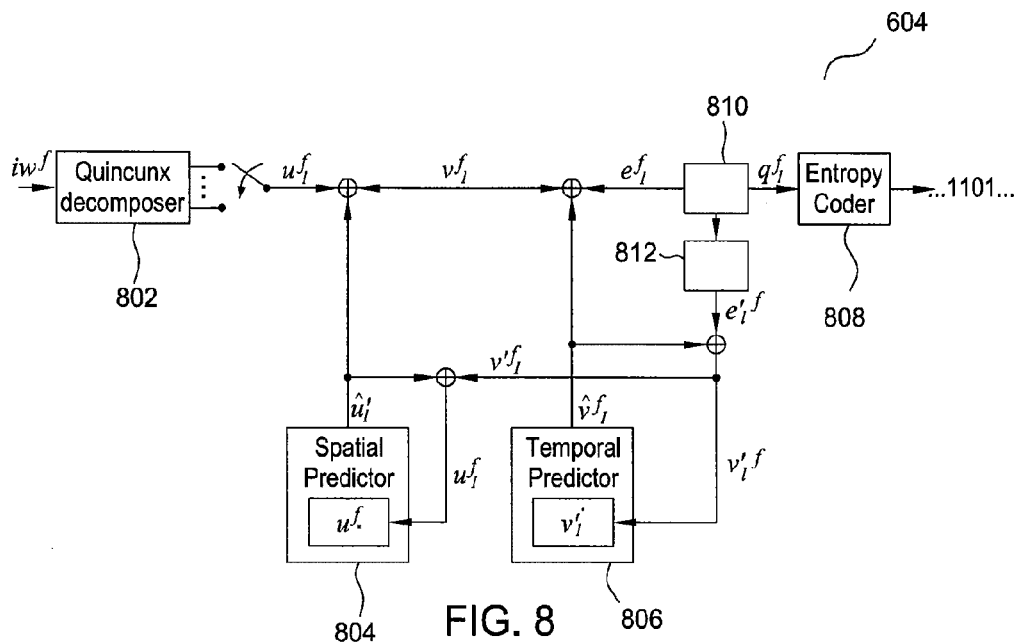
FIG. 8 illustrates components of a warps encoder, according to one embodiment of the invention.

As described above, in one embodiment, the warps encoder 604 encodes a sequence of inverse warps that map pixel shapes from each frame of the retargeted video to the corresponding frame of the source video. For convenience, inverted warps $iw^f$ may hence be denoted as $w^f$. Further, strong spatial and temporal dependencies may exist within and between warps, respectively. In one embodiment, the warps encoder 604 exploits these dependencies to compress the inverse warps more efficiently. FIG. 8 illustrates components of the warps encoder 604 of FIG. 6, according to one embodiment of the invention. As shown, the components include a quincunx decomposer 802, a spatial predictor 804, a temporal predictor 806, an entropy coder 808, a quantizer 810, and an inverse quantizer 812.

In one embodiment, the warps encoder 604 encodes a sequence of inverse warps $iw^1, \ldots, iw^f$ in a hierarchical frame coding order. The hierarchical frame coding order is further described below in conjunction with FIG. 9. The warps encoder 604 may perform a quincunx decomposition to exploit the regularity of a warp. Specifically, the quincunx decomposer 802 decomposes the parameter domain D of each inverse warp $iw^f$ into disjoint subsets $D_l$ with $$D = \bigcup_{l=1}^{L} D_l. \quad \text{(Equation 7)}$$

Thus, the quincunx decomposer 802 outputs a vector of dimension $2|D_l|$ stacking all vertex positions $iw^f[i,j]$ with $(i,j)$ in $D_l$. This vector of grid vertex positions may be denoted as $u_l^f$. The quincunx decomposition is further described below in conjunction with FIG. 10.

In one embodiment, for each frame f, the spatial predictor 804 successively encodes vectors $u_l^f$ from low to high spatial layer l. The vector of each spatial layer is spatially decorrelated from the decoded vectors of lower spatial layers of the same frame. The spatial predictor 804 calculates a spatial prediction error vector $$v_l^f := u_l^f - \hat{u}_l^f, \quad \text{(Equation 8)}$$

which is temporally decorrelated in the following step. The temporal predictor 806 uses decoded spatial prediction error vectors $v'^r_l$ of processed frames r to predict $v_l^f$. Thus, the warps encoder 604 calculates a spatio-temporal prediction error vector $$e_l^f := v_l^f - \hat{v}_l^f. \quad \text{(Equation 9)}$$

Generally, the warps encoder 604 may spatially predict function values of a higher-resolution spatial layer by determining barycenters of neighboring function values from a lower-resolution spatial layer. The warps encoder 604 may also temporally predict spatial prediction errors for the higher-resolution spatial layer based on: (i) the spatially predicted function values and (ii) spatial prediction errors from encoding another warp function that is selected according to a predefined coding order, thereby generating spatio-temporal prediction errors. Each function value may be selected from at least: (i) a pixel position determined by a point-based warp and (ii) vertex positions of a quad determined by a quad-based warp. Spatial prediction and temporal prediction are further described below in conjunction with FIG. 11.

In one embodiment, the quantizer 810 and entropy coder 808 quantize and entropy-code, respectively, the coordinates of each spatio-temporal prediction error vector $e_l^f$. The quantizer 810 may quantize each coordinate e according to $$q = \left\lceil \frac{e}{\Delta} - 0.5 \right\rceil \text{ if } e \geq 0 \text{ and} \quad \text{(Equation 10)}$$

$$q = \left\lfloor \frac{e}{\Delta} + 0.5 \right\rfloor \text{ if } e < 0 \quad \text{(Equation 11)}$$

for some quantization step size $\Delta$. The entropy coder 808 may entropy-code the quantized coordinates using context-adaptive binary arithmetic coding (CABAC). The inverse quantizer 812 may reconstruct the quantized spatio-temporal prediction errors to vector $e'^f_l$, which may be distorted by quantization errors. The vector $e'^f_l$ may be used to reconstruct the spatial prediction error vector $v'^f_l$. The spatial prediction error vector $v'^f_l$ may be stored for use in temporal prediction of the same layer l of following frames. Further, the spatial prediction error vector $v'^f_l$ may be used to reconstruct the vector $u'^f_l$ that includes decoder-side grid vertex positions. These vertex positions may be stored for use in spatial prediction of higher spatial layers of the same frame.

Figure 9:
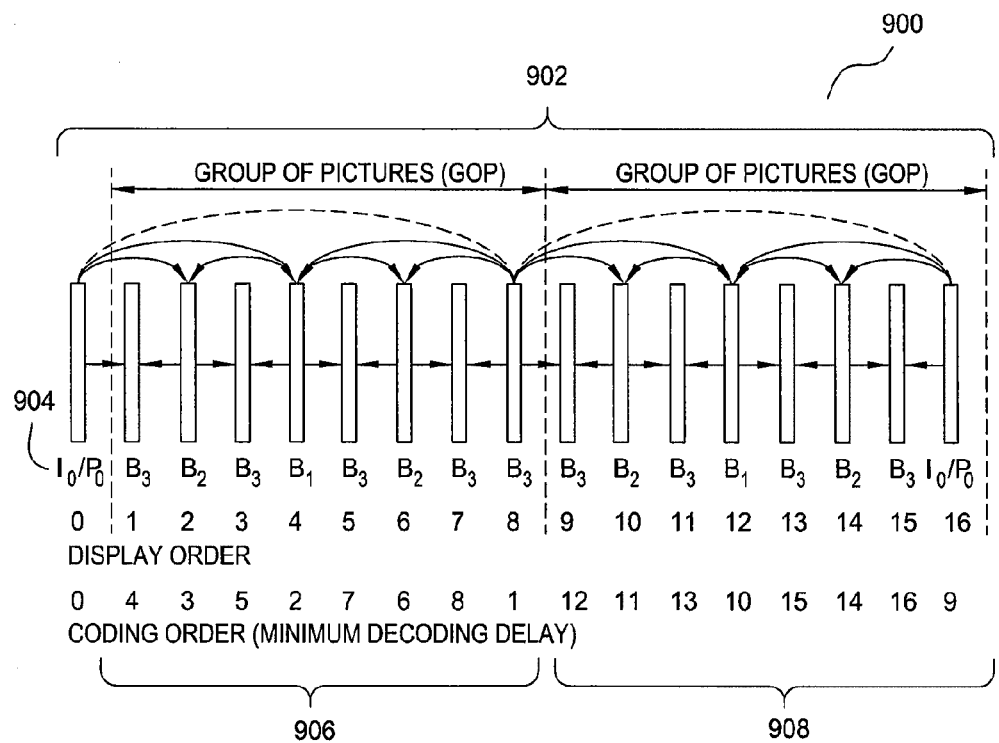
FIG. 9 illustrates a hierarchical frame coding order with four temporal layers, according to one embodiment of the invention.

As described above, in one embodiment, the warps encoder 604 encodes a sequence of inverse warps $iw^1, \ldots, iw^F$ in a hierarchical frame coding order. FIG. 9 illustrates a hierarchical frame coding order 900 with four temporal layers, according to one embodiment of the invention. As shown, the sequence of inverse warps 902 is partitioned into a first inverse warp 904 followed by groups of inverse warps. The groups of inverse warps include a first group of inverse warps 906 and a second group of inverse warps 908. Each group may include $2^{T-1}$ frames, where T represents the number of temporal layers supported by the hierarchical frame coding order. As shown, within each group of inverse warps, corresponding frames are displayed in the following order: 1, 2, 3, 4, 5, 6, 7, and 8. In one embodiment, the warps may be encoded in a hierarchical frame coding order according to the following order: 8, 4, 2, 1, 3, 6, 5, and 7. In one embodiment, by using the same coding order for images and warps, both images and warps may be encoded (and decoded) together frame by frame.

As described above, in one embodiment, the warps encoder 604 may perform a quincunx decomposition to exploit the regularity of an inverse warp. In one embodiment, the warps encoder 604 derives a partition of the parameter domain D using a hierarchical representation of D. In one embodiment, the hierarchical representation of D is a quincunx resolution pyramid. The quincunx resolution pyramid may be specified by sets $S_l$ having the property $$D =: S_0 \supset \ldots \supset S_{L-1}. \quad \text{(Equation 12)}$$

Figure 10:
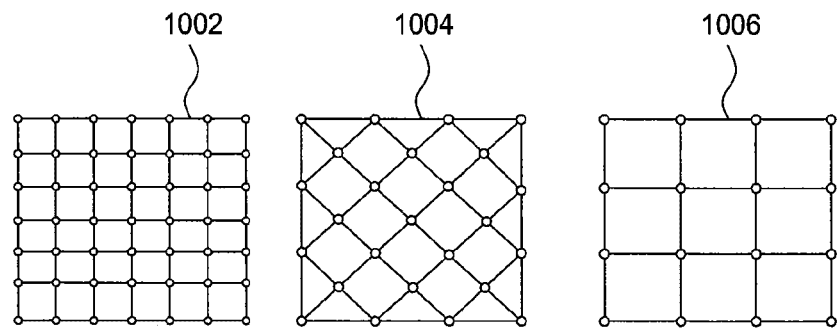
FIG. 10 illustrates three successive resolutions of a quincunx resolution pyramid, according to one embodiment of the invention.

FIG. 10 illustrates three successive resolutions 1002, 1004, 1006 of a quincunx resolution pyramid, according to one embodiment of the invention. As shown, the resolution 1004 is a subset of the resolution 1002. Further, the resolution 1006 is a subset of the resolution 1004. In one embodiment, a quincunx resolution pyramid of D is defined by $$S_l := \begin{bmatrix} 1 & -1 \\ 1 & 1 \end{bmatrix}^l Z^2 \cap D \quad \text{(Equation 13)}$$

where $$\begin{bmatrix} 1 & -1 \\ 1 & 1 \end{bmatrix}^l Z^2$$

denotes the set of all 2D points $$\begin{bmatrix} 1 & -1 \\ 1 & 1 \end{bmatrix}^l \begin{pmatrix} i \\ j \end{pmatrix}$$

where i and j are integer coordinates. In one embodiment, a partition is derived according to $$D_1 := S_{L-1} \text{ and} \quad \text{(Equation 14)}$$

$$D_l := S_{L-l} \backslash S_{L-l+1} \quad \text{(Equation 15)}$$

for l=2, ..., L.

Figure 11:
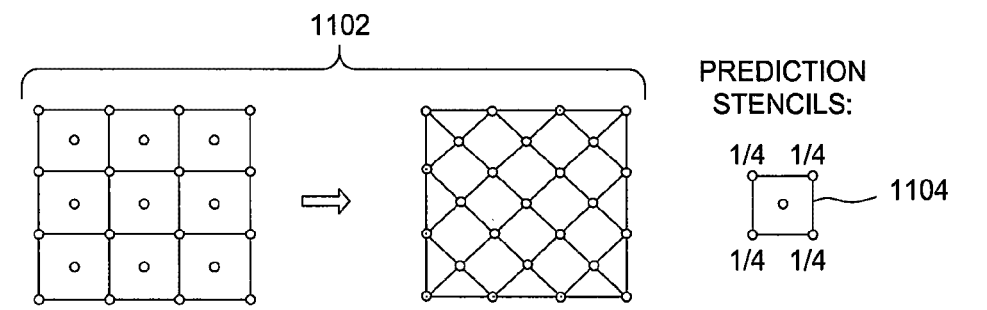
FIG. 11 illustrates two types of spatial prediction, according to one embodiment of the invention.
Figure 11:
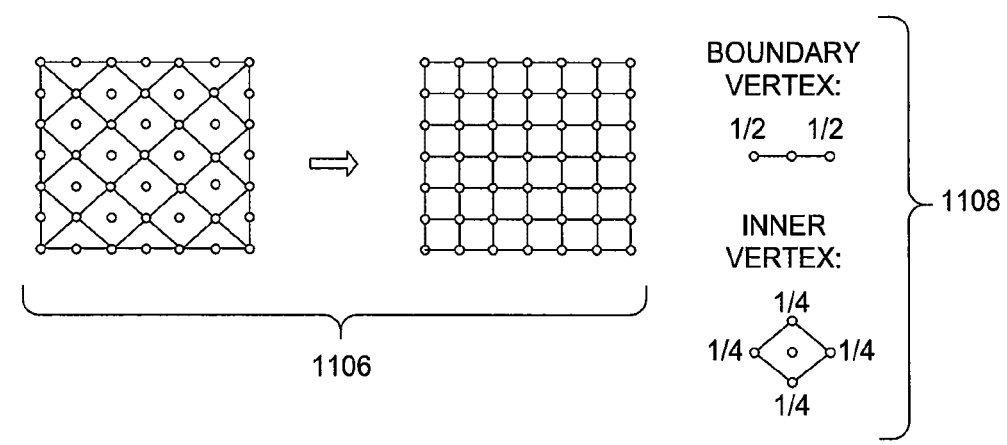

As described above, in one embodiment, the warps encoder 604 exploits spatial dependencies to compress the inverse warps more efficiently. Referring back to FIG. 8, a vector $u_l^f$ includes coordinates of vertex positions $iw^f[i, j]$ where $(i,j)^r \in D_l$. Each vertex position $iw^f[i,j]$ where $(i,j)^r \in D_l$ is predicted using decoded vertex positions $iw^f[i, j]$ where $(i, j)^r \in D_k$ for k<l. In one embodiment, the warps encoder 604 performs spatial prediction using spatially-close decoded vertex positions. Thus, the warps encoder 604 may store predicted vertex positions $i\hat{w}^f[i,j]$ in a vector $\hat{u}_l^f$ of the same dimension as $u_l^f$. FIG. 11 illustrates two types 1102, 1106 of spatial prediction that are iteratively applied per frame during coding, according to one embodiment of the invention. Each type 1102, 1106 of spatial prediction may be performed according to a respective prediction stencil 1104, 1108.

As described above, in one embodiment, the warps encoder 604 exploits temporal dependencies to compress the inverse warps more efficiently. The hierarchical frame coding order of FIG. 9 includes decoded frames (reference frames). These frames may be used for temporal prediction. In one embodiment, the warps encoder 604 may perform intra-coded frame (I-frame), predictive frame (P-frame), and bi-predictive frame (B-frame) prediction based on the number of reference frames used, which may be 0, 1, and 2, respectively. For I-frame prediction, each spatial prediction error vector $v_i^f$ may be predicted by a zero vector, i.e., $\hat{v}_i^f := \vec{0}$. Hence, no temporal prediction is performed. For P-frame prediction, spatial prediction error vector $v'_i{}^r$ of reference frame r may be used for prediction according to $\hat{v}_i^f := v'_i{}^r$ (Equation 16). Similarly, for B-frame prediction using reference frames $r_1$ and $r_2$, a prediction may be defined according to $$\hat{v}_i^f := \frac{1}{2}(v_i''^{r_1} + v_i''^{r_2}). \quad \text{(Equation 17)}$$

In one embodiment, the warps encoder 604 may alternatively use an image-based approach (rather than the quad-grid-based approach described above) to encode warps. The warps encoder 604 may separate the 2D positions $w^f[i,j] = (w_x^f[i,j], w_y^f[i,j])$ by x- and y-coordinates. The warps encoder 604 may then quantize and store the respective coordinates in two separate grayscale images $D_x^f[i,j], D_y^f[i,j]$ for encoding as video.

Figure 12:
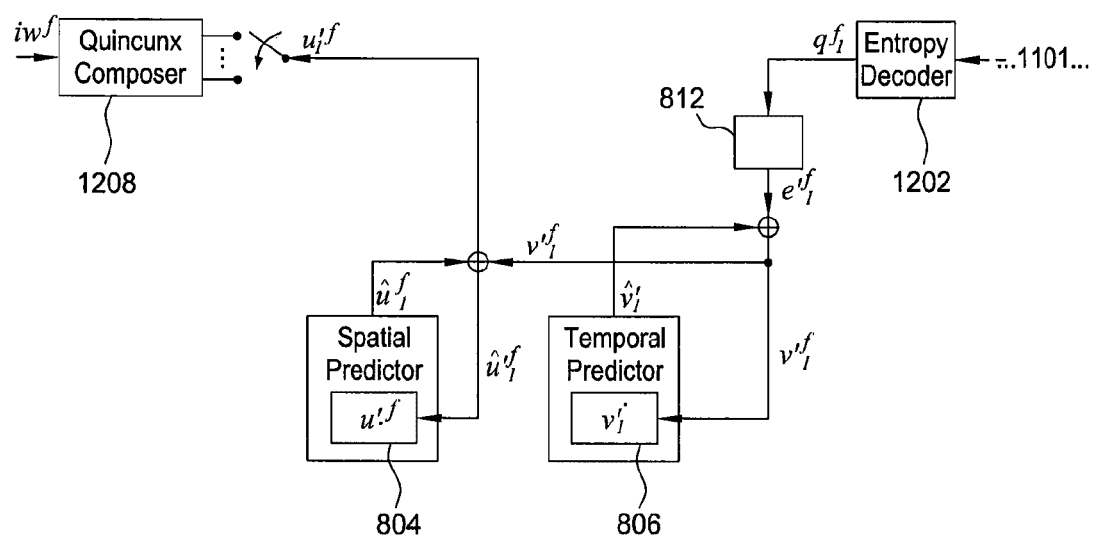
FIG. 12 illustrates components of a warps decoder, according to one embodiment of the invention.

In one embodiment, the warps decoder 606 decodes inverse warps that are encoded by the warps coder 604. FIG. 12 illustrates components of the warps decoder 606, according to one embodiment of the invention. As shown, the components include an entropy decoder 1202, the temporal predictor 806, the spatial predictor 804, a quincunx composer 1208, and an inverse quantizer 812. The entropy decoder 1202 decodes output from the entropy coder 808 of FIG. 8. In one embodiment, the entropy decoder 812 successively decodes all quantized spatio-temporal prediction errors $q_i^f$ of all frames in the hierarchical frame coding order. For each frame and each spatial layer, the inverse quantizer 812 computes spatio-temporal prediction errors $e'_i{}^f$, which may be used by the temporal predictor 806 to reconstruct spatial prediction errors $v'_i{}^f$, which may then be used by the spatial predictor 804 to reconstruct grid vertex positions $u'_i{}^f$ of a spatial layer l. After reconstructing the spatial layers $u'_1{}^f, \ldots, u'_L{}^f$ of a frame, all grid vertex positions $iw'_i{}^f[i,j]$ with $(i,j) \in D$ are reconstructed. In one embodiment, the quincunx composer 1208 combines the reconstructed grid vertex positions to produce an inverse warp $iw_i^f$.

As described above, in one embodiment, the prediction module 610 performs inverse retargeting to generate the predicted video 158. Assume that there are two image sequences $I_1^f$ and $I_2^f$ with parameter domains $\{1, \ldots, N_1\} \times \{1, \ldots, M_1\}$, respectively, $\{1, \ldots, N_2\} \times \{1, \ldots, M_2\}$, with different aspect ratios $N_1|M_1$ and $N_2|M_2$. Assume that $I_2^f$ is the retargeted image sequence that is used for predicting the source image sequence $I_1^f$. Inverse retargeting predicts $I_1^f$ using $I_2^f$ and a warp function. In a first approach to predicting $I_1^f$, referred to herein as "forward mapping," the warp function may have the resolution of the retargeted image sequence $I_2^f$. In a second approach to predicting $I_1^f$, referred to herein as "backward mapping," the warp function may have the resolution of the source image sequence $I_1^f$. Because the retargeted image sequence $I_2^f$ has a lower resolution than the source image sequence $I_1^f$, using forward mapping for predicting $I_1^f$ may, in some cases, result in a lower bitrate overhead than backward mapping. However, using backward mapping for predicting $I_1^f$ may, in some cases, result in a higher degree of prediction accuracy than backward mapping. That is, the backward mapping and forward mapping approaches to predicting $I_1^f$ may represent a tradeoff between increasing prediction accuracy and decreasing bitrate costs for warp coding.

In one embodiment, the prediction module 610 performs inverse retargeting using the backward mapping approach. The prediction module 610 may derive a point-based warp (e.g., having a resolution of 1280×720) from the corresponding quad-based warp (e.g., having a resolution of 1281×721). The point-based warp describes pixel positions rather than pixel shapes of the quad-based warp. The point-based warp may have the resolution of the source image sequence $I_1^f$. The prediction module 610 may then compute a corresponding pixel position (x, y) in the retargeted image sequence $I_2^f$. The computed position (x, y) may not necessarily be on the pixel raster of the retargeted image sequence $I_2^f$. The prediction module 610 may then compute a predicted value $\hat{I}_1$ using spline interpolation. As is known, spline interpolation is a form of interpolation in the field of numerical analysis where the interpolant is a special type of piecewise polynomial called a spline. A spline is a special function defined piecewise by polynomials.

In one embodiment, the prediction module 610 performs inverse retargeting using the forward mapping approach. The prediction module 610 may compute an inverse warp $iw^f$ from a given warp by deriving a continuous parameterization of the warp function using generalized barycentric coordinates. The prediction module 610 may then deform the shape of each pixel of $I_2^f$ according to the inverse warp $iw^f$ to produce a continuous image having the aspect ratio of the source image sequence $I_1^f$. The prediction module 610 may then sample the continuous image using a Dirac comb having the resolution of the source image sequence $I_1^f$. The prediction module 610 may also perform low-pass filtering on the sampled image to reduce aliasing artifacts in the sampled image.

As described above, inverse retargeting using the forward mapping approach predicts $I_1^f$ using $I_2^f$ and $iw^f$. Further, $iw^f[i,j] \in [0, N_1] \times [0, M_1]$ maps from the discrete parameter domain with $i \in \{0, \ldots, N_2\}$ and $j \in \{0, \ldots, M_2\}$. Note that pixel position (i,j) is assigned to a quad with vertex positions (i,j), (i−1,j), (i,j−1), (i−1,j−1) in the discrete parameter domain of the inverse warp function $iw^f[., .]$.

For convenience, the frame index f is omitted from the notation $I_1, I_2$ and w in the following definitions.

YUV-Image:

$$I[n,m] = \begin{pmatrix} Y[n,m] \\ U[n,m] \\ V[n,m] \end{pmatrix} \in \{0, \ldots, 255\}^3 \quad \text{(Equation 18)}$$

Indicator Function, Box Filter:

$$1_{n,m}(x,y) := \begin{cases} 1 & n-1 \leq x < n \text{ and } m-1 \leq y < m \\ 0 & \text{otherwise} \end{cases} \quad \text{(Equation 19)}$$

Continuous Image:

$$I(x,y) = \sum_{n=1}^{N}\sum_{m=1}^{M} I[n,m] 1_{n,m}(x,y) = \begin{pmatrix} Y(x,y) \\ U(x,y) \\ V(x,y) \end{pmatrix} \quad \text{(Equation 20)}$$

$$\text{sinc}(x) := \begin{cases} 1 & x=0 \\ \dfrac{\sin \pi x}{\pi x} & \text{otherwise} \end{cases} \quad \text{(Equation 21)}$$

According to the definitions, a continuous image $I_2(x, y)$ is obtained by folding image $I_2[n,m]$ with a box filter. A predicted continuous image $\hat{I}_1(x, y)$ is obtained by $$\hat{I}_1(x_1, y_1) := I_2(x_2, y_2) \text{ with } (x_1, y_1) = w(x_2, y_2) \quad \text{(Equation 22)}$$

This prediction approach corresponds to folding the retargeted image $I_2(x, y)$ with a continuous shift variant indicator function specified by the shape of quads of the warp function w.

In one embodiment, a discrete predicted image $\hat{I}_1[.,.]$ can be obtained by sampling $\hat{I}_1$ using a Dirac comb, i.e., $$\hat{I}[i,j] := \hat{I}_1(i-0.5, j-0.5) \quad \text{(Equation 23)}$$

for $i \in \{1, \ldots, N_1\}$ and $j \in \{1, \ldots, M_1\}$. However, the predicted continuous image $\hat{I}_1(x_1, y_1)$ may have discontinuities in the image domain, due to shift variant folding with an indicator function (discontinuities at quad boundaries). This may produce aliasing artifacts in the discrete predicted image $\hat{I}[i, j]$.

In one embodiment, although the predicted continuous image $\hat{I}_1(.,.)$ is not band limited (sampling theorem cannot be satisfied), aliasing artifacts due to sampling may be reduced by sampling the predicted continuous image $\hat{I}(.,.)$ with a higher sampling frequency followed by appropriate low-pass filtering and down-sampling. An image derived by using a $2^k$-times higher sampling frequency is defined by $$\hat{I}_{1,k}[i,j] := \hat{I}_1\left(\frac{i}{2^k} - 2^{-k-1}, \frac{j}{2^k} - 2^{-k-1}\right) \quad \text{(Equation 24)}$$

for $i \in \{1, \ldots, 2^k N_1\}$ and $j \in \{1, \ldots, 2^k M_1\}$. After filtering and down-sampling according to $$\hat{I}_1[i,j] := \hat{I}_{1,k} * g[2^k i, 2^k j] \quad \text{(Equation 25)}$$

using an appropriate 2D low-pass filter g[.,.], a prediction of image I[i, j] with reduced aliasing artifacts may be derived. The double sampling frequency of k=1 has proven useful in some cases to increase the prediction quality after filtering.

In one embodiment, specific cutoff frequencies may be used for low-pass filtering. Assume that prediction is performed using an uniform warp function—i.e., a warp function defined by equally shaped quads. This results in a predicted continuous image $$\hat{I}_1(x,y) = I_2(s_x x, s_y y) \quad \text{(Equation 26)}$$

with $$s_x = \frac{N_2}{N_1} < 1 \text{ and } s_y = \frac{M_2}{M_1} < 1.$$

Hence, the predicted image is obtained by a linear stretching of image $I_2(.,.)$. Thus, the corresponding Fourier spectrum, e.g., of the luminance channel $Y_1$, is obtained by linearly compressing the Fourier spectrum of $Y_2$ by factors $$\frac{1}{s_x} \text{ and } \frac{1}{s_y}.$$

Consequently, the highest frequency of the Fourier series of the predicted digital image $\hat{I}_1[i,j]$ is lower than or equal to $\pm s_x \pi$ and $\pm s_y \pi$ in horizontal and vertical directions, respectively. Assuming that a uniform warp function sufficiently approximates the actual warp function, the cutoff frequencies of $\pm s_x \pi$ and $\pm s_y \pi$ may be used for performing low-pass filtering.

In one embodiment, the predicted continuous image can be filtered horizontally and vertically using a Lanczos filter. A continuous 1D Lanczos may be defined according to $$l(x) := \begin{cases} \text{sinc}(x) \cdot \text{sinc}\left(\dfrac{x}{a}\right) & -a < x < a \\ 0 & \text{otherwise} \end{cases} \quad \text{(Equation 27)}$$

and represents a finite impulse response (FIR) filter approximation of a sinc-filter with cutoff frequency $\pm \pi$. A corresponding discrete Lanczos filter may be defined according to $$l_s[n] := s \cdot l(sn) \quad \text{(Equation 28)}$$

for a cutoff frequency of $\pm s\pi$. Further, a=4 may be applied. Note that $l_s[n]$ has support between $$-\frac{a}{s} \text{ and } \frac{a}{s}.$$

In one embodiment, the predicted continuous image can be filtered by multiplying the Fourier-spectrum of the image with a box-function with appropriate cutoff frequencies for the horizontal and vertical directions. This corresponds to folding the image in the original domain over the width and height of the image with an aliased discrete 1D sinc function. Because the filter spans the width and height (respectively) of the image, the filter may be performed more efficiently in the Fourier domain.

Figure 13:
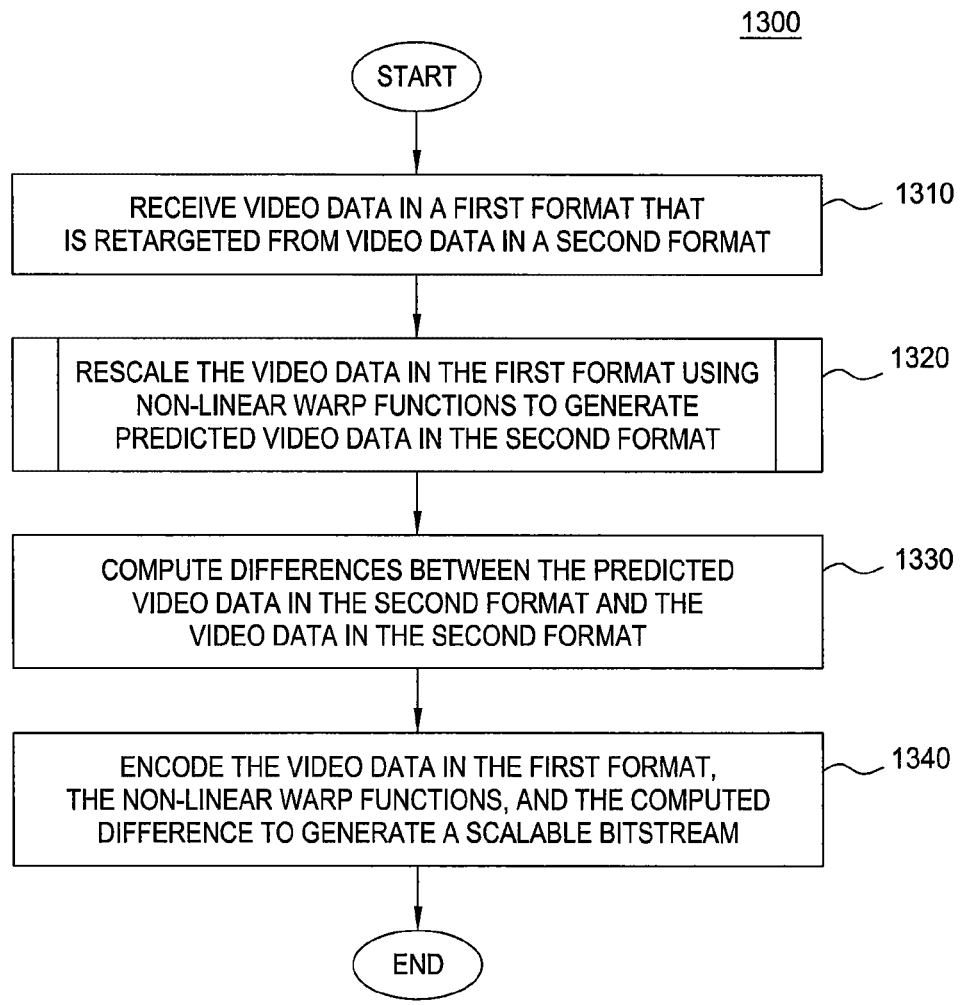
FIG. 13 is a flowchart depicting a method for performing scalable video coding, according to one embodiment of the invention.

FIG. 13 is a flowchart depicting a method 1300 for performing scalable video coding, according to one embodiment of the invention. As shown, the method 1300 begins at step 1310, where the video coder 150 receives video data in a first format. The video data in the first format corresponds to the retargeted video 154 of FIG. 1. In one embodiment, the video data in the first format may be retargeted from video data in a second format. The video data in the second format corresponds to the source video 152 of FIG. 1. At step 1320, the video coder 150 rescales the video data in the first format using non-linear warp functions to generate predicted video data in the second format. The predicted video data in the second format corresponds to the predicted video 158 of FIG.

1. The step 1320 is further described below in conjunction with FIG. 14. At step 1330, the video coder 150 computes differences 160 between the predicted video data in the second format and the video data in the second format. At step 1340, the video coder 150 encodes the video data in the first format, the non-linear warp functions, and the computed differences to generate a scalable bitstream. After the step 1340, the method 1300 terminates.

Figure 14:
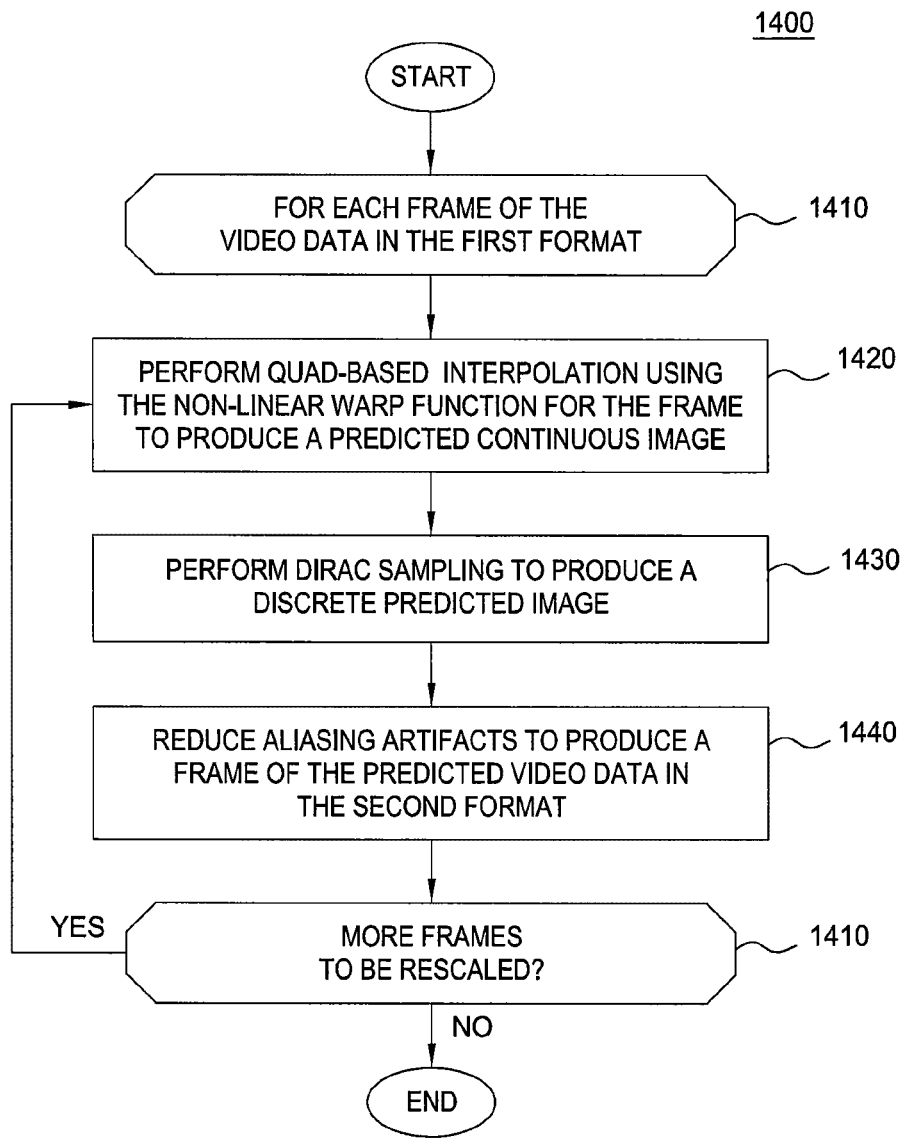
FIG. 14 is a flowchart depicting a method for predicting the video data in the second format, according to one embodiment of the invention.

FIG. 14 is a flowchart depicting a method 1400 for predicting the video data in the second format, according to one embodiment of the invention. The method 1400 corresponds to the step 1320 of FIG. 13. As shown, the method 1400 begins at step 1410, where the video coder 150 enters a loop to process each frame of video data in the first format. At step 1420, the video coder 150 performs quad-based interpolation using the non-linear warp function for the respective frame to produce a predicted continuous image. For example, the video coder 150 can fold the frame with a continuous shift variant indicator function specified by the shape of quads of the non-linear warp function. Further, the non-linear warp function for the respective frame may be an inverse warp function computed based on a corresponding non-linear warp function for retargeting the video data in the first format from the video data in the second format. At step 1430, the video coder 150 performs Dirac sampling to produce a discrete predicted image. For instance, the video coder 150 may sample the predicted continuous image using a Dirac comb. At step 1440, the video coder 150 removes aliasing artifacts from the discrete predicted image to produce a frame of the predicted video data in the second format. At step 1450, the video coder 150 determines whether more frames (of the video data in the first format) remain to be rescaled. If so, the method 1400 returns to the step 1420 to process a next frame of the video data in the first format. Otherwise, the method 1400 terminates.

Figure 15:
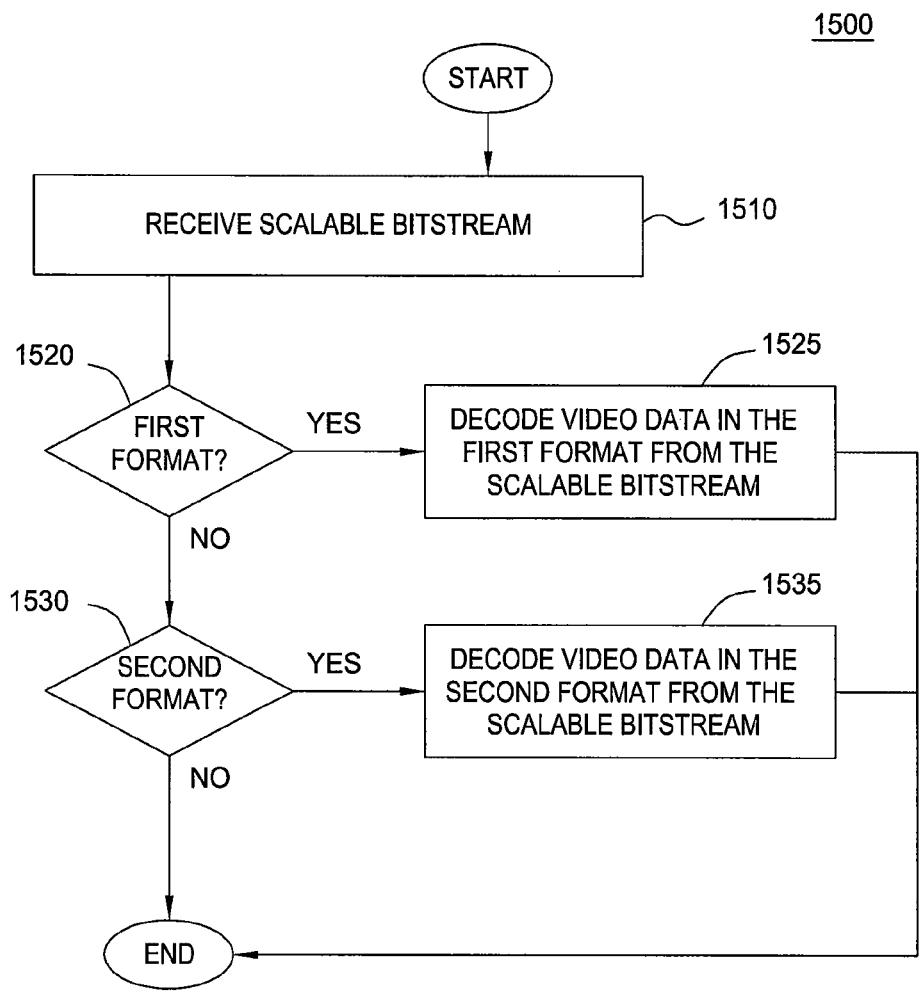
FIG. 15 is a flowchart depicting a method for selectively decoding video data having different formats from the scalable bitstream, according to one embodiment of the invention.

FIG. 15 is a flowchart depicting a method 1500 for selectively decoding video data having different formats from the scalable bitstream 162 of FIG. 1, according to one embodiment of the invention. As shown, the method 1500 begins at step 1510, where the video decoder 164 receives the scalable bitstream. If the first format is desired (step 1520), the video decoder 164 decodes the video data in the first format from the scalable bitstream (step 1525). For example, the video decoder 162 may decode the base layer of the scalable bitstream. If the second format is desired (step 1530), the video decoder 162 decodes the video data in the second format from the scalable bitstream (step 1535). For example, the video decoder 164 decodes the base layer, warp functions 156, and image differences 160 from the bitstream. The video decoder 164 generates the video data in the second format from the decoded base layer, warp functions 156, and image differences 160. After the step 1535, the method 1500 terminates.

Advantageously, embodiments of the invention provide techniques for scalable video coding that supports nonlinear warps between target platforms. One embodiment of the invention generates a scalable bitstream that may be transmitted and selectively decoded to produce output video for one of a plurality of predefined target platforms. Consequently, video content that is suited for multiple target platforms may be stored and transmitted more efficiently. Further, supporting nonlinear (rather than linear) warps between target platforms may result in output video that is be better suited to a given target platform.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method to encode images, the method comprising:
  receiving a retargeted sequence of images having a target image resolution, wherein the retargeted sequence of images is retargeted from a source sequence of images having a source image resolution, the source image resolution having a different aspect ratio than the target image resolution;
  determining at least one non-linear warp function configured to generate a predicted sequence of images having the source image resolution from the retargeted sequence of images having the target image resolution;
  determining differences between the predicted sequence of images having the source image resolution and the source sequence of images having the source image resolution by operation of one or more computer processors; and
  generating a bitstream by encoding at least three components including:
   (i) a first component comprising the received retargeted sequence of images having the target image resolution;
   (ii) a second component comprising the at least one non-linear warp function; and
   (iii) a third component comprising the determined differences;
  wherein the bitstream is decodable to generate a sequence of images in the target image resolution based on the first component and also decodable to generate a sequence of images in the source image resolution based on the three components.

2. The computer-implemented method of claim 1, further comprising:
  generating, from the bitstream, a sequence of images in one of target image resolution and the source image resolution.

3. The computer-implemented method of claim 2, wherein the at least one non-linear warp function is determined using generalized barycentric coordinates.

4. The computer-implemented method of claim 3, wherein the source image resolution is higher than the target image resolution, wherein the at least one non-linear warp function is configured to map from a lower resolution comprising the target image resolution, to a higher resolution comprising the source image resolution, wherein the at least one non-linear warp function comprises at least one quad-based warp, wherein each quad-based warp specifies how pixel shapes from the retargeted sequence of images are deformed in mapping to the predicted sequence of images, and wherein the predicted sequence of images is generated by an application, wherein the application is configured to, in a first instance, generate the predicted sequence of images via backward mapping by:
  deriving, from the at least one quad-based warp, at least one point-based warp, wherein each point-based warp specifies pixel positions of the predicted sequence of images;
  determining pixel positions of the retargeted sequence of images based on the specified pixel positions of the predicted sequence of images; and determining pixel values for the predicted sequence of images using spline interpolation based on: (i) the retargeted sequence of images and (ii) the determined pixel positions of the retargeted sequence of images.

5. The computer-implemented method of claim 4, wherein the at least one non-linear warp function comprises at least one inverse warp, wherein each inverse warp comprises a quad-based warp which specifies a quad in the predicted sequence of images for each pixel of the retargeted sequence of images, wherein the at least one inverse warp is derived from a continuous parameterization, via generalized barycentric coordinates, of at least one non-linear warp function for retargeting the retargeted sequence of images from the source sequence of images, and wherein the application is further configured to, in a second instance, generate the predicted sequence of images via forward mapping by:
   deforming pixel shapes of the retargeted sequence of images based on the at least one inverse warp to generate a sequence of continuous images;
   sampling the sequence of continuous images to generate a sequence of sampled images; and
   performing low-pass filtering on the sequence of sampled images to generate the predicted sequence of images.

6. The computer-implemented method of claim 5, wherein the application is further configured to, in a third instance, encode the at least one non-linear warp function by:
   encoding: (i) a first image comprising quantized x-coordinates of the at least one non-linear warp function; and (ii) a second image comprising quantized y-coordinates of the at least one non-linear warp function.

7. The computer-implemented method of claim 6, wherein the application is further configured to, in a fourth instance, encode the at least one non-linear warp function by:
   decomposing a parameter domain of the at least one non-linear warp function based on a quincunx resolution pyramid to generate a plurality of spatial layers, each spatial layer comprising a subset of the parameter domain and of the corresponding image domain of the at least one non-linear warp function, wherein the plurality of spatial layers comprises a lower-resolution spatial layer and a higher-resolution spatial layer; and
   predictively encoding the higher-resolution spatial layer based on the lower-resolution spatial layer.

8. The computer-implemented method of claim 7, wherein predictively encoding the higher-resolution spatial layer comprises:
   spatially predicting function values of the higher-resolution spatial layer by determining barycenters of neighboring function values from the lower-resolution spatial layer;
   temporally predicting spatial prediction errors for the higher-resolution spatial layer based on: (i) the spatially predicted function values and (ii) spatial prediction errors from encoding another non-linear warp function of the at least one non-linear warp function, wherein the another non-linear warp function is selected according to a predefined coding order, thereby generating spatio-temporal prediction errors;
   quantizing the spatio-temporal prediction errors; and
   entropy-coding the quantized spatio-temporal prediction errors.

9. A non-transitory computer-readable medium containing a program which, when executed, performs an operation to encode images, the operation comprising:
   receiving a retargeted sequence of images having a target image resolution, wherein the retargeted sequence of images is retargeted from a source sequence of images having a source image resolution, the source image resolution having a different aspect ratio than the target image resolution;
   determining at least one non-linear warp function configured to generate a predicted sequence of images having the source image resolution from the retargeted sequence of images having the target image resolution;
   determining differences between the predicted sequence of images having the source image resolution and the source sequence of images having the source image resolution; and
   generating a bitstream by encoding at least three components including:
      (i) a first component comprising the received retargeted sequence of images having the target image resolution;
      (ii) a second component comprising the at least one non-linear warp function; and
      (iii) a third component comprising the determined differences;
   wherein the bitstream is decodable to generate a sequence of images in the target image resolution based on the first component and also decodable to generate a sequence of images in the source image resolution based on the three components.

10. The non-transitory computer-readable medium of claim 9, wherein the operation further comprises:
   generating, from the bitstream, a sequence of images in one of target image resolution and the source image resolution.

11. The non-transitory computer-readable medium of claim 10, wherein the at least one non-linear warp function is determined using generalized barycentric coordinates.

12. The non-transitory computer-readable medium of claim 11, wherein the source image resolution is higher than the target image resolution, wherein the at least one non-linear warp function is configured to map from a lower resolution comprising the target image resolution, to a higher resolution comprising the source image resolution, wherein the at least one non-linear warp function comprises at least one quad-based warp, wherein each quad-based warp specifies how pixel shapes from the retargeted sequence of images are deformed in mapping to the predicted sequence of images, and wherein the predicted sequence of images is generated by an application, wherein the application is configured to, in a first instance, generate the predicted sequence of images via backward mapping by:
   deriving, from the at least one quad-based warp, at least one point-based warp, wherein each point-based warp specifies pixel positions of the predicted sequence of images;
   determining pixel positions of the retargeted sequence of images based on the specified pixel positions of the predicted sequence of images; and
   determining pixel values for the predicted sequence of images using spline interpolation based on: (i) the retargeted sequence of images and (ii) the determined pixel positions of the retargeted sequence of images.

13. The non-transitory computer-readable medium of claim 12, wherein the at least one non-linear warp function comprises at least one inverse warp, wherein each inverse warp comprises a quad-based warp which specifies a quad in the predicted sequence of images for each pixel of the retargeted sequence of images, wherein the at least one inverse warp is derived from a continuous parameterization, via generalized barycentric coordinates, of at least one non-linear warp function for retargeting the retargeted sequence of images from the source sequence of images, and wherein the application is further configured to, in a second instance, generate the predicted sequence of images via forward mapping by:
 deforming pixel shapes of the retargeted sequence of images based on the at least one inverse warp to generate a sequence of continuous images;
 sampling the sequence of continuous images to generate a sequence of sampled images; and
 performing low-pass filtering on the sequence of sampled images to generate the predicted sequence of images.

14. The non-transitory computer-readable medium of claim 13, wherein the application is further configured to, in a third instance, encode the at least one non-linear warp function by:
 encoding: (i) a first image comprising quantized x-coordinates of the at least one non-linear warp function; and (ii) a second image comprising quantized y-coordinates of the at least one non-linear warp function.

15. The non-transitory computer-readable medium of claim 14, wherein the application is further configured to, in a fourth instance, encode the at least one non-linear warp function by:
 decomposing a parameter domain of the at least one non-linear warp function based on a quincunx resolution pyramid to generate a plurality of spatial layers, each spatial layer comprising a subset of the parameter domain and of the corresponding image domain of the at least one non-linear warp function, wherein the plurality of spatial layers comprises a lower-resolution spatial layer and a higher-resolution spatial layer; and
 predictively encoding the higher-resolution spatial layer based on the lower-resolution spatial layer.

16. The non-transitory computer-readable medium of claim 15, wherein predictively encoding the higher-resolution spatial layer comprises:
 spatially predicting function values of the higher-resolution spatial layer by determining barycenters of neighboring function values from the lower-resolution spatial layer;
 temporally predicting spatial prediction errors for the higher-resolution spatial layer based on: (i) the spatially predicted function values and (ii) spatial prediction errors from encoding another non-linear warp function of the at least one non-linear warp function, wherein the another non-linear warp function is selected according to a hierarchical frame coding order, thereby generating spatio-temporal prediction errors;
 quantizing the spatio-temporal prediction errors; and
 entropy-coding the quantized spatio-temporal prediction errors.

17. A system to encode images, the system comprising:
a computer processor; and
a memory containing a program, which when executed by the computer processor is configured to perform an operation comprising:
 receiving a retargeted sequence of images having a target image resolution, wherein the retargeted sequence of images is retargeted from a source sequence of images having a source image resolution, the source image resolution having a different aspect ratio than the target image resolution;
 determining at least one non-linear warp function configured to generate a predicted sequence of images having the source image resolution from the retargeted sequence of images having the target image resolution;
 determining differences between the predicted sequence of images having the source image resolution and the source sequence of images having the source image resolution; and
 generating a bitstream by encoding at least three components including:
  (i) a first component comprising the received retargeted sequence of images having the target image resolution;
  (ii) a second component comprising the at least one non-linear warp function; and
  (iii) a third component comprising the determined differences;
 wherein the bitstream is decodable to generate a sequence of images in the target image resolution based on the first component and also decodable to generate a sequence of images in the source image resolution based on the three components.

18. The system of claim 17, wherein the operation further comprises:
 generating, from the bitstream, a sequence of images in one of target image resolution and the source image resolution.

19. The system of claim 18, wherein the at least one non-linear warp function is determined using generalized barycentric coordinates.

20. The system of claim 19, wherein the source image resolution is higher than the target image resolution, wherein the at least one non-linear warp function is configured to map from a lower resolution comprising the target image resolution, to a higher resolution comprising the source image resolution, wherein the at least one non-linear warp function comprises at least one quad-based warp, wherein each quad-based warp specifies how pixel shapes from the retargeted sequence of images are deformed in mapping to the predicted sequence of images, and wherein the predicted sequence of images is generated by an application, wherein the application is configured to, in a first instance, generate the predicted sequence of images via backward mapping by:
 deriving, from the at least one quad-based warp, at least one point-based warp, wherein each point-based warp specifies pixel positions of the predicted sequence of images;
 determining pixel positions of the retargeted sequence of images based on the specified pixel positions of the predicted sequence of images; and
 determining pixel values for the predicted sequence of images using spline interpolation based on: (i) the retargeted sequence of images and (ii) the determined pixel positions of the retargeted sequence of images.

21. The system of claim 20, wherein the at least one non-linear warp function comprises at least one inverse warp, wherein each inverse warp comprises a quad-based warp which specifies a quad in the predicted sequence of images for each pixel of the retargeted sequence of images, wherein the at least one inverse warp is derived from a continuous parameterization, via generalized barycentric coordinates, of at least one non-linear warp function for retargeting the retargeted sequence of images from the source sequence of images, and wherein the application is further configured to, in a second instance, generate the predicted sequence of images via forward mapping by:
 deforming pixel shapes of the retargeted sequence of images based on the at least one inverse warp to generate a sequence of continuous images;
 sampling the sequence of continuous images to generate a sequence of sampled images; and performing low-pass filtering on the sequence of sampled images to generate the predicted sequence of images.

22. The system of claim 21, wherein the application is further configured to, in a third instance, encode the at least one non-linear warp function by:
encoding: (i) a first image comprising quantized x-coordinates of the at least one non-linear warp function; and (ii) a second image comprising quantized y-coordinates of the at least one non-linear warp function.

23. The system of claim 22, wherein the application is further configured to, in a fourth instance, encode the at least one non-linear warp function by:
decomposing a parameter domain of the at least one non-linear warp function based on a quincunx resolution pyramid to generate a plurality of spatial layers, each spatial layer comprising a subset of the parameter domain and of the corresponding image domain of the at least one non-linear warp function, wherein the plurality of spatial layers comprises a lower-resolution spatial layer and a higher-resolution spatial layer; and
predictively encoding the higher-resolution spatial layer based on the lower-resolution spatial layer.

24. The system of claim 23, wherein predictively encoding the higher-resolution spatial layer comprises:
spatially predicting function values of the higher-resolution spatial layer by determining barycenters of neighboring function values from the lower-resolution spatial layer;
temporally predicting spatial prediction errors for the higher-resolution spatial layer based on: (i) the spatially predicted function values and (ii) spatial prediction errors from encoding another non-linear warp function of the at least one non-linear warp function, wherein the another non-linear warp function is selected according to a hierarchical frame coding order, thereby generating spatio-temporal prediction errors;
quantizing the spatio-temporal prediction errors; and
entropy-coding the quantized spatio-temporal prediction errors.

25. A computer-implemented method to decode images, the method comprising:
receiving a bitstream comprising at least three components including:
(i) a first component comprising an encoded retargeted sequence of images having a target image resolution;
(ii) a second component comprising at least one encoded non-linear warp function to predict a source sequence of images having a source image resolution from the retargeted sequence of images, to thereby generate a predicted sequence of images having the source image resolution, the source image resolution having a different aspect ratio than the target image resolution; and
(iii) a third component comprising encoded differences between the source sequence of images and the predicted sequence of images;
wherein the bitstream is decodable to generate a sequence of images in the target image resolution based on the first component and also decodable to generate a sequence of images in the source image resolution based on the three components; and
decoding the bitstream by operation of one or more computer processors to generate a sequence of images in one of target image resolution and the source image resolution.

26. A computer-implemented method to provide encoded images, the method comprising:
receiving a request for a bitstream; and
transmitting the bitstream in response to the request and by operation of one or more computer processors, wherein the bitstream comprises at least three components including:
(i) a first component comprising an encoded retargeted sequence of images having a target image resolution;
(ii) a second component comprising at least one encoded non-linear warp function to predict a source sequence of images having a source image resolution from the retargeted sequence of images, to thereby generate a predicted sequence of images having the source image resolution, the source image resolution having a different aspect ratio than the target image resolution; and
(iii) a third component comprising encoded differences between the source sequence of images and the predicted sequence of images;
wherein the bitstream is decodable to generate a sequence of images in the target image resolution based on the first component and also decodable to generate a sequence of images in the source image resolution based on the three components.

27. A computer-implemented method to encode images, the method comprising:
generating a bitstream by encoding, by operation of one or more computer processors, at least three components including:
(i) a first component comprising a retargeted sequence of images having a target image resolution;
(ii) a second component comprising at least one non-linear warp function to predict a source sequence of images having a source image resolution from the retargeted sequence of images, to thereby generate a predicted sequence of images having the source image resolution, the source image resolution having a different aspect ratio than the target image resolution; and
(iii) a third component comprising differences between the source sequence of images and the predicted sequence of images;
wherein the bitstream is decodable to generate a sequence of images in the target image resolution based on the first component and also decodable to generate a sequence of images in the source image resolution based on the three components.

28. A computer-implemented method to facilitate image encoding, the method comprising:
receiving a retargeted sequence of images having a target image resolution, wherein the retargeted sequence of images is retargeted from a source sequence of images having a source image resolution, the source image resolution having a different aspect ratio than the target image resolution; and
by operation of one or more computer processors and using at least one non-linear warp function, generating a predicted sequence of images having the source image resolution from the retargeted sequence of images having the target image resolution;
wherein at least three components are encodable to generate a bitstream, the at least three components including:
(i) a first component comprising the retargeted sequence of images;
(ii) a second component comprising the at least one non-linear warp function; and (iii) a third component comprising differences between the source sequence of images and the predicted sequence of images;

wherein the bitstream is decodable to generate a sequence of images in the target image resolution based on the first component and also decodable to generate a sequence of images in the source image resolution based on the three components.

29. The computer-implemented method of claim 28, wherein the at least one non-linear warp function comprises at least one quad-based warp, wherein each quad-based warp specifies how pixel shapes from the source sequence of images are deformed, and wherein the predicted sequence of images is generated by an application, wherein the application is configured to, in a first instance, generate the predicted sequence of images via backward mapping by:

deriving, from the at least one quad-based warp, at least one point-based warp, wherein each point-based warp specifies pixel positions of the predicted sequence of images;

determining pixel positions of the retargeted sequence of images based on the specified pixel positions of the predicted sequence of images; and determining pixel values for the predicted sequence of images using spline interpolation based on: (i) the retargeted sequence of images and (ii) the determined pixel positions of the retargeted sequence of images.

30. The computer-implemented method of claim 29, wherein the at least one non-linear warp function comprises at least one inverse warp, wherein each inverse warp comprises a quad-based warp which specifies a quad in the source sequence of images for each pixel of the retargeted sequence of images, wherein the at least one inverse warp is derived from at least one non-linear warp function for retargeting the retargeted sequence of images from the source sequence of images, and wherein the application is further configured to, in a second instance, generate the predicted sequence of images via forward mapping by:

deforming pixel shapes of the retargeted sequence of images based on the at least one inverse warp to generate a sequence of continuous images;

sampling the sequence of continuous images to generate a sequence of sampled images; and performing low-pass filtering on the sequence of sampled images to generate the predicted sequence of images.

31. The computer-implemented method of claim 30, wherein each inverse warp comprises a continuous parameterization, via generalized barycentric coordinates, of the at least one non-linear warp function for retargeting the retargeted sequence of images from the source sequence of images.

32. A computer-implemented method to facilitate image encoding, the method comprising:

providing at least one non-linear warp function configured to generate a predicted sequence of images having a source image resolution from the retargeted sequence of images having a target image resolution, wherein the retargeted sequence of images is retargeted from a source sequence of images having the source image resolution, the source image resolution having a different aspect ratio than the target image resolution; and encoding the at least one non-linear warp function by operation of one or more computer processors;

wherein at least three components are encodable to generate a bitstream, the at least three components including:
(i) a first component comprising the retargeted sequence of images;
(ii) a second component comprising the at least one non-linear warp function; and
(iii) a third component comprising differences between the source sequence of images and the predicted sequence of images;

wherein the bitstream is decodable to generate a sequence of images in the target image resolution based on the first component and also decodable to generate a sequence of images in the source image resolution based on the three components.

33. The computer-implemented method of claim 32, wherein the at least one non-linear warp function is encoded by an application, wherein the application is configured to, in a first instance, encode the at least one non-linear warp function by:

encoding: (i) a first image comprising quantized x-coordinates of the at least one non-linear warp function; and (ii) a second image comprising quantized y-coordinates of the at least one non-linear warp function.

34. The computer-implemented method of claim 33, wherein the application is further configured to, in a second instance, encode the at least one non-linear warp function by:

decomposing a parameter domain of the at least one non-linear warp function based on a quincunx resolution pyramid to generate a plurality of spatial layers, each spatial layer comprising a subset of the parameter domain and of the corresponding image domain of the at least one non-linear warp function, wherein the plurality of spatial layers comprises a lower-resolution spatial layer and a higher-resolution spatial layer; and predictively encoding the higher-resolution spatial layer based on the lower-resolution spatial layer.

35. The computer-implemented method of claim 34, wherein predictively encoding the higher-resolution spatial layer comprises:

spatially predicting function values of the higher-resolution spatial layer by determining barycenters of neighboring function values from the lower-resolution spatial layer;

temporally predicting spatial prediction errors for the higher-resolution spatial layer based on: (i) the spatially predicted function values and (ii) spatial prediction errors from encoding another non-linear warp function of the at least one non-linear warp function, wherein the another non-linear warp function is selected according to a predefined coding order, thereby generating spatio-temporal prediction errors;

quantizing the spatio-temporal prediction errors; and entropy-coding the quantized spatio-temporal prediction errors.

36. The computer-implemented method of claim 35, wherein each function value is selected from at least: (i) a pixel position determined by a point-based warp and (ii) vertex positions of a quad determined by a quad-based warp.

* * * * *